US008249971B2

(12) United States Patent
Baker (10) Patent No.: US 8,249,971 B2
(45) Date of Patent: Aug. 21, 2012

(54) SYSTEM AND METHOD FOR MANAGING INVESTMENTS IN INFRASTRUCTURE ASSETS

(75) Inventor: W. Kirk Baker, Dallas, TX (US)

(73) Assignee: Hunt Power, L.P., Dallas, TX (US)

( * ) Notice: Subject to any disclaimer, the term of this patent is extended or adjusted under 35 U.S.C. 154(b) by 922 days.

(21) Appl. No.: 11/936,324

(22) Filed: Nov. 7, 2007

(65) Prior Publication Data

US 2008/0109385 A1 May 8, 2008

Related U.S. Application Data (60) Provisional application No. 60/857,551, filed on Nov. 8, 2006.

(51) Int. Cl.
*G06Q 40/00* (2012.01)
(52) U.S. Cl. .............. 705/36 R; 705/4; 705/30; 705/31; 705/35; 705/38
(58) Field of Classification Search ................ 705/4, 30, 705/31, 35, 36 R, 38
See application file for complete search history.

(56) References Cited

U.S. PATENT DOCUMENTS

| 6,192,347 | B1 * | 2/2001 | Graff | 705/36 R |
| 6,381,585 | B1 | 4/2002 | Maples et al. | 705/36 |
| 2002/0065739 | A1 | 5/2002 | Florance et al. | 705/26 |
| 2002/0091623 | A1 | 7/2002 | Daniels | 705/37 |
| 2002/0194099 | A1 | 12/2002 | Weiss | 705/36 |
| 2003/0078897 | A1 | 4/2003 | Florance et al. | 705/80 |
| 2003/0229592 | A1 | 12/2003 | Florance et al. | 705/51 |
| 2003/0233301 | A1 | 12/2003 | Chen et al. | 705/36 |
| 2004/0030616 | A1 | 2/2004 | Florance et al. | 705/27 |
| 2005/0071265 | A1 | 3/2005 | Nishimaki | 705/38 |
| 2005/0216384 | A1 | 9/2005 | Partlow et al. | 705/35 |
| 2006/0218069 | A1 | 9/2006 | Aberman et al. | 705/37 |

OTHER PUBLICATIONS

"Portfolio Characteristics and Net Asset Values in REITs," The Canadian Journal of Economics, vol. 29, Special Issue: Part 2 (Apr. 1996), pp. S520-S526.*
*Notification of Transmittal of the International Search Report and the Written Opinion of the International Searching Authority* for International Application No. PCT/US07/83923; 7 pages, Apr. 28, 2008.

* cited by examiner

*Primary Examiner* — Daniel Felten
(74) *Attorney, Agent, or Firm* — Baker Botts L.L.P.

(57) ABSTRACT

A system comprises a memory operable to store financial data associated with a business entity having a plurality of shares. The business entity may receive, directly or indirectly, income associated with rent or lease of infrastructure assets, the rent or lease paid by a first company to a second company. The system further comprises a processor that is communicatively coupled to the memory and that is operable to determine a value of each share. The processor is further operable to calculate an increase in the value of each share in response to an increase of capital expenditures associated with the infrastructure assets.

30 Claims, 4 Drawing Sheets

START OF YEAR

| | ASSETS | LIABILITIES | SHARES | SHARE VALUE |
|---|---|---|---|---|
| | 100,000,000 | 50,000,000 | 500,000 | 100 |
| | 16 | | 22 | 32 |

END OF YEAR

| | RENTAL INCOME | CAPITAL EXPENDITURES | TAXABLE INCOME | REQ'D DISTRIBUTION | ASSETS | LIABILITIES | SHARES | SHARE VALUE |
|---|---|---|---|---|---|---|---|---|
| 202 EXAMPLE 1 | 10,000,000 | 10,000,000 | 0 | 0 | 110,000,000 | 50,000,000 | 500,000 | 120 |
| 204 EXAMPLE 2 | 10,000,000 | 2,000,000 | 8,000,000 | 7,200,000 | 102,000,000 | 50,000,000 | 500,000 | 104 |
| | 24 | 26 | | 14 | 16 | | 22 | 32 |

SYSTEM AND METHOD FOR MANAGING INVESTMENTS IN INFRASTRUCTURE ASSETS

RELATED APPLICATION

This application claims priority to U.S. Provisional Application No. 60/857,551 filed Nov. 8, 2006, entitled "System and Method for Facilitating Business Transactions."

TECHNICAL FIELD

The present disclosure relates generally to investing and more specifically to a system and method for managing investments in infrastructure assets.

BACKGROUND

Power delivery systems in the United States and other areas of the world are aging. Projected demands for power may outstrip the capacity of existing transmission and distribution assets unless significant capital is devoted to improvement, modernization, and expansion of such assets. Utility companies that own transmission and distribution assets, however, have been unable to entice investors to contribute capital to such an endeavor. One reason for this is that transmission and distribution assets have typically been subject to regulated returns that are lower than the unregulated returns from power generation and/or other energy-related enterprises. Accordingly, traditional systems have not valued transmission and distribution assets independently; instead, traditional systems have valued such assets based on their impact on power generation and/or other enterprises.

Another reason for the lack of capital investment in transmission and distributions assets is that utility companies have been economically deterred from divesting themselves of these assets. Despite regulatory policies that encourage such divestiture, many existing transmission and distribution assets are heavily depreciated. Due to the unfavorable tax consequences of divesting assets that are heavily depreciated, utility companies have generally avoided divesting themselves of their transmission and distribution assets.

SUMMARY

In some embodiments, a system comprises a memory operable to store financial data associated with a real estate investment trust (REIT) having a plurality of REIT shares. The REIT may receive, directly or indirectly, income associated with rent or lease of real estate paid by a first company to a second company. The system may further comprise a processor communicatively coupled to the memory and operable to determine a value of each REIT share. The processor is further operable to calculate an increase in the value of each REIT share in response to an increase of capital expenditures associated with the real estate. In some embodiments, the REIT may be replaced by a Master Limited Partnership (MLP).

In other embodiments, a system comprises a memory operable to store financial data associated with a business entity having a plurality of shares. The business entity may receive, directly or indirectly, income associated with rent or lease of infrastructure assets, the rent or lease paid by a first company to a second company. The system further comprises a processor communicatively coupled to the memory and operable to determine a value of each share. The processor is further operable to calculate an increase in the value of each share in response to an increase of capital expenditures associated with the infrastructure assets.

Certain embodiments of the system may offer various advantages. Some, none, or all embodiments may benefit from the below described advantages. One advantage is that the system may allow income associated with infrastructure assets to qualify as rental income from real property. According to certain embodiments, one or more components of the system may be considered as real property for distribution and/or other purposes. In some embodiments, the rental income from real property may (1) expand the pool of potential investors and/or (2) allow infrastructure assets to be valued according to their ability to generate predictable available cash flow for distribution.

Another advantage is that the system may permit investors to efficiently invest in infrastructure assets. Some or all of the infrastructure assets may be subject to a regulated return. However, in some embodiments, the system may provide to the investor in the regulated infrastructure assets an unregulated market return rather than a regulated return.

Another advantage is that the system may comprise an investment company that derives its income from the lease of infrastructure assets to operating utilities. The investment company may own one or more entities that make capital expenditures to expand, modernize, and improve the infrastructure assets. In some embodiments, the value of the investment company's shares increase in response to an increase in capital expenditures in the infrastructure assets. Thus, the system may provide incentives for increasing capital expenditures in infrastructure assets. In addition, the system may provide incentives for companies to separate their transmission and distribution assets from their generation assets. Yet another advantage is that the investment company may qualify for single-tier taxation, which may expand the ability of capital markets to invest in infrastructure assets. In addition, the system may allow an entity that contributes infrastructure assets to the system to receive value for the contributed assets while reducing or avoiding unfavorable tax consequences. Further advantages are described in greater detail below.

Other advantages will be readily apparent to one skilled in the art from the description and the appended claims.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

Power delivery systems and other delivery and storage infrastructure systems in the United States and other areas of the world are aging. As illustrated by recent blackouts in the northeastern United States, power delivery systems have not been able to support existing and growing load demands for electrical power. Projected demands for power may outstrip the capacity of existing power transmission and distribution assets unless energy-related markets allow capital to be efficiently invested in the improvement, modernization, and expansion of such assets.

Traditionally, utility companies that own transmission and distribution assets have been unable and/or unwilling to make these assets available to the competitive market or to alternative sources of capital investment and ownership. One reason for this is that, based on their desire to preserve market position, utility companies have used their transmission and distribution assets to control access to competing power generation sources. Another reason is that, to avoid undesirable tax consequences, utility companies have avoided separating their transmission and distribution assets from their power generation enterprises. Yet another reason is that some infrastructure assets are regulated. As a result, investors in such assets are subject to a regulated return that is not commensurate with market returns associated with unregulated assets. Consequently, absent a rate hike or price incentive on the regulated assets, utility companies have traditionally been unmotivated to make capital expenditures to expand and upgrade regulated assets.

The failure of utility companies to invest capital in transmission and distribution assets has caused such assets to heavily depreciate. This depreciation has compounded challenges associated with energy-related infrastructures. In addition, due to unfavorable tax consequences caused by selling a depreciated asset, utility companies have not been motivated to divest their transmission and distribution assets. These unfavorable tax consequences have thwarted the deregulation efforts of government agencies. In particular, despite deregulation policies that call for utility companies to structurally separate transmission and distribution assets from generation assets, utility owners (even those that are motivated to do so) have been discouraged by the negative tax consequences associated with divesting a heavily depreciated asset. Thus, there is a need for a system that, in some embodiments, allows investors in a competitive marketplace to efficiently invest capital to expand and upgrade transmission and distribution assets.

Figure 1:
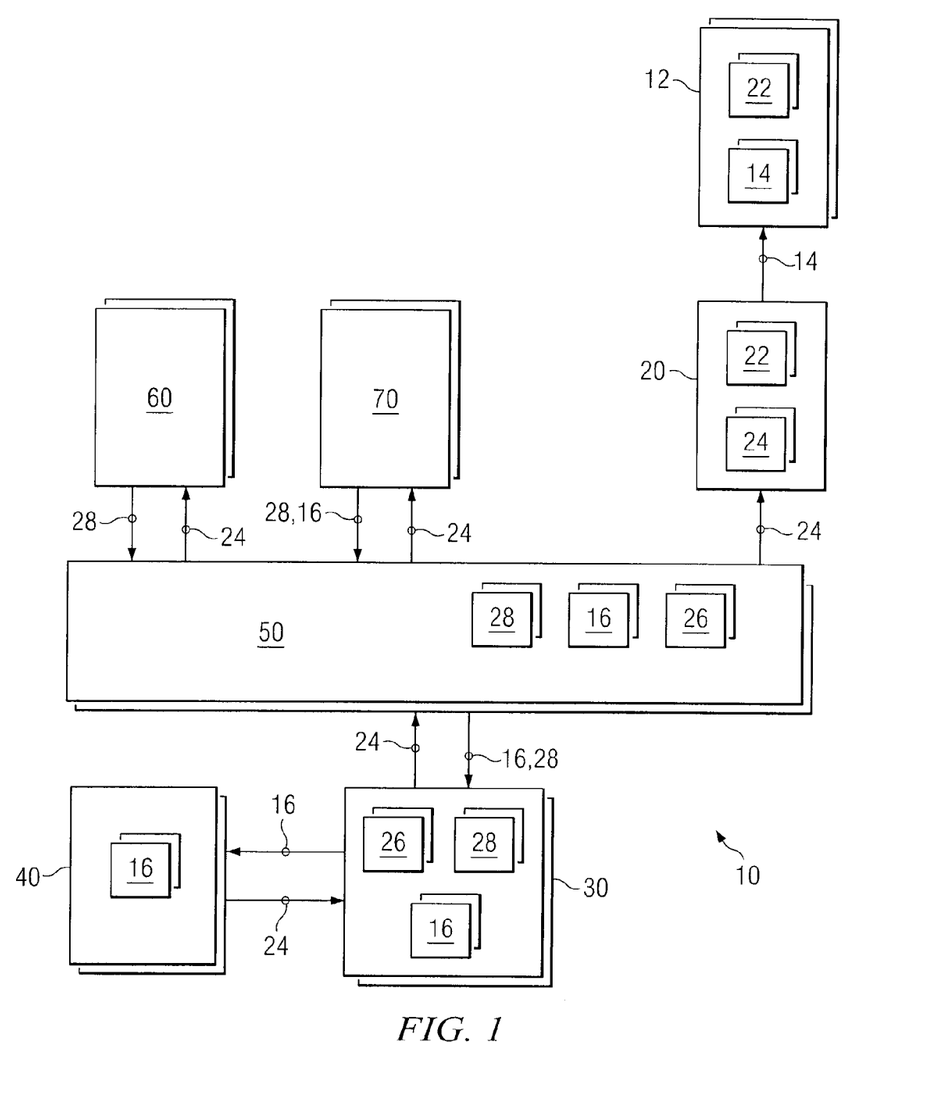
FIG. 1 illustrates an investment system, according to certain embodiments.

FIG. 1 illustrates an investment system 10, according to certain embodiments. System 10 may provide incentives for investors 12 to invest in infrastructure assets 16 associated with industries in which investing has traditionally been unattractive such as, for example, various energy industries. Some or all infrastructure assets 16 may be subject to regulated rates of return. In some embodiments, infrastructure assets 16 may be held by companies that are not subject to regulated rates such as, for example, the regulated rates for electricity transmission and distribution. The companies that hold infrastructure assets 16 may realize unregulated market returns that are competitive with the unregulated enterprises of such companies. In some embodiments, in addition to conventional real estate assets, system 10 may allow infrastructure assets 16, income derived from infrastructure assets 16, and/or other components of system 10 to be considered as real estate. According to certain embodiments, system 10 may allow infrastructure assets 16 to be valued according to overall cash flow relative to other entities rather than being valued based merely on regulated rates. Thus, system 10 may allow the companies that hold infrastructure assets 16 to receive investment capital from an expanded pool of investors 12. In some embodiments, the companies that hold investments associated with infrastructure assets 16 may qualify for single-tier taxation instead of two-tier taxation. As a result, system 10 may provide investors 12 with the benefit of centralized management and diversified investment in passive infrastructure assets 16.

In some embodiments, system 10 may permit investments from foreign investors 12 without subjecting these foreign investors 12 to domestic taxation. In addition, system 10 may provide incentives for entities that currently own infrastructure assets 16 to contribute those infrastructure assets 12 as venture companies 70 and defer the tax liability resulting from the transfer. According to certain embodiments, system 10 may provide incentives for entities that currently own regulated infrastructure assets 16 to contribute those regulated infrastructure assets 16 as venture companies 70 and still maintain an indirect ownership interest in the contributed infrastructure assets 16 while earning an unregulated return that is market commensurate.

Generally, system 10 comprises an investment company 20, one or more property companies 30, one or more operating utilities 40, one or more capital companies 50, a sponsor company 60, and one or more venture companies 70.

Investment company 20 refers generally to a business entity that derives income from various assets. Investment company 20 may qualify for single-tier taxation or two-tier taxation based, at least in part, on the types of assets associated with investment company 20. Under single-tier taxation, investment company 20 receives pass-through treatment for income that investment company 20 distributes to its investors 12. Thus, investors 12 pay the taxes related to the earnings of the investment company. In contrast, under two-tier taxation, a company pays taxes on its earnings, and investors 12 also pay taxes on dividends that they receive from those same earnings. The assets from which investment company 20 derives income through intervening entities may be referred to as infrastructure assets 16. In some embodiments, infrastructure assets 16 comprise components of the infrastructures of energy delivery industries. For example, infrastructure assets 16 may comprise real estate, electricity transmission and distribution assets (ETDAs), pipelines, transmission towers, substations, storage facilities, and/or other suitable assets associated with energy and other resources, including assets associated with infrastructure-related industries. Investment company 20 may be structured as a corporation, general partnership, limited partnership, limited liability company, trust, cooperative, and/or any suitable business entity. In some embodiments, investment company 20 is a Real Estate Investment Trust (REIT) or a Master Limited Partnership (MLP).

A REIT refers to an entity that receives all or a portion of its income from passive investments in real estate. A REIT may receive pass-through treatment for income that the REIT distributes to its shareholders. Thus, the portion of the REIT's income that is distributed to investors 12 may be taxed to the investors 12 but not taxed to the REIT. To be designated as a REIT, investment company 20 may be required to satisfy one or more regulatory requirements. These requirements may be established by the regulations of an appropriate governing body (e.g., the Internal Revenue Code for REITs in the United States, the Finance Act of 2006 for REITs in the United Kingdom, and so forth). In some embodiments, these regulatory requirements specify that a REIT must distribute at least a predetermined percentage of its taxable income to its investors 12. For example, under the Internal Revenue Code, a REIT may be required to annually distribute at least ninety percent of its taxable income to its investors 12. It should be understood, however, that the particular percentage that a REIT is required to distribute may vary by jurisdiction and according to changes in regulations.

In some embodiments, the REIT may be domestically controlled. In such embodiments, an interest in the REIT (i.e., an investment company share 22) may not be a "United States real property interest." Thus, a foreign investor 12 may be able to sell an interest in the REIT without being subject to domestic income taxation. In some embodiments, a REIT is "domestically controlled" if less than fifty percent of the value of the REIT shares is held directly or indirectly by foreign investors 12.

According to certain embodiments, a REIT may be required to have transferable shares (or certificates of interest), to be managed by a board of directors (or trustees), and/or to derive at least a predetermined percentage (e.g., ninety-five percent) of its income from dividends, interest, and/or property income. In some embodiments, a REIT may be required to have at least a predetermined percentage (e.g., seventy-five percent) of its investable assets in real estate. According to certain embodiments, a REIT may be required to derive at least a predetermined percentage (e.g., seventy-five percent) of its gross income from rents and/or mortgage interest. It should be understood that a governing body may establish any number and combination of requirements for REIT status.

As explained above, a REIT receives all or a portion of its income from passive investments that are associated with real estate. Real estate may refer to land as well as fixtures, buildings, and/or other items that are attached to the land. Real estate may comprise facilities and infrastructure associated with transportation, energy, national resources, refineries, and/or other suitable industries. In some embodiments, real estate comprises electricity transmission and distribution assets (ETDAs). ETDAs are an example of one type of infrastructure asset 16. ETDAs may comprise transmission towers, cables, utility poles, transformers, transmission substations, insulators, power lines, grounding systems, circuit breakers, relay panels, battery systems, communication systems, power meters, shield wires, generators, and/or other suitable equipment associated with the transmission and distribution of electricity. ETDAs may be subject to a regulated rate that is set by a state or federal agency (e.g., Federal Energy Regulatory Commission, California Public Utilities Commission, etc.). A REIT may derive income from investments in ETDAs and/or other real estate assets.

In other embodiments, investment company 20 may qualify as a Master Limited Partnership (MLP). A MLP receives partnership taxation treatment, and shares of a MLP may be publicly listed and traded on an exchange. In some embodiments, MLPs primarily derive their income from the exploration, development, real estate leasing, mining or production, processing, refining, transportation (including pipelines transporting gas, oil, or products thereof), or marketing related to any mineral or natural resource (including, among other things, fertilizer, geothermal energy, and timber). According to certain embodiments, to qualify as a MLP, investment company 20 may be required to derive at least a predetermined percentage (e.g., ninety percent) of its income from the above activities.

In certain embodiments, the business operations of MLPs focus on managing assets related to the upstream, midstream, and downstream enterprises related to minerals and natural resources. For the use of its assets and services, a particular MLP generates operating revenue, of which a significant portion may be passed through to its investors 12 in the form of periodic (e.g., quarterly) cash distributions 14. In certain embodiments, a relatively large portion of these cash distributions 14 (e.g., approximately eighty to ninety percent) may be deferred from taxation until investor 12 sells its ownership interest in the particular MLP.

According to certain embodiments, MLPs do not pay income taxes due to their partnership structure. As a result, investors 12 generally pay income tax at the shareholder level. Consequently, in some embodiments, investors 12 in MLPs are not subject to two-tier taxation. The partnership structure of MLPs may allow MLPs to pass their income as well as expense items such as depreciation, depletion and interest expense directly through to investors 12, thereby eliminating the need to pay taxes at the corporate level. According to certain embodiments, this "pass-through" feature increases after-tax distribution 14 of investor 12 versus a similar investment in a typical corporate entity. In some embodiments, the absence of corporate taxation on the operations of a MLP effectively reduces its cost of capital. According to certain embodiments, investment company 20 may qualify as a REIT or MLP even though some or all of the leased infrastructure assets 16 may not be land or structures or fixtures attached to land.

Regardless of whether investment company 20 is a MLP, a REIT, or other suitable entity, investment company 20 may comprise ownership interests that are publicly or privately traded among investors 12. The ownership interests in investment company 20 may be referred to as investment company shares 22. An investor 12 that owns investment company shares 22 may be an individual, a market maker, a broker-dealer, a collective, a legal entity (such as a corporation), an agent acting on behalf of a principal, and/or any suitable party that is able to buy and/or sell financial instruments.

In some embodiments, investment company 20 may own, directly or indirectly, at least part of property company 30. Property company 30 generally refers to a business entity that owns or has a right to use infrastructure assets 16. In some embodiments, a government agency may regulate the operations and/or debt levels of property company 30. Property company 30 may lease infrastructure assets 16 to one or more operating utilities 40. Property company 30 may be structured as a corporation, general partnership, limited partnership, limited liability company, cooperative, and/or any suitable business entity.

Operating utility 40 generally refers to a business entity that operates and/or maintains an infrastructure for a public service. In some embodiments, operating utility 40 manages, operates, and/or maintains ETDAs to deliver electricity to customers. In other embodiments, operating utility 40 manages, operates, and/or maintains other infrastructure assets 16 such as, for example, pipelines, oil storage facilities, drilling equipment, pump stations, refineries, timber mills, geothermal plants, and/or other facilities associated with the exploration, development, production, processing, refining, or transportation of mineral or natural resources. For at least some of these services (e.g., electricity distribution and transmission), payments from customers to operating utility 40 may be based on regulated rates. To qualify as an operating utility 40, an entity may be required to obtain a license or certificate (e.g., Certificate of Convenience and Necessity) from an appropriate governing body. Operating utility 40 may be structured as a corporation, general partnership, limited partnership, limited liability company, cooperative, and/or any suitable business entity. In some embodiments, operating utility 40 owns at least a portion of property company 30. For example, operating utility 40 may be a general partner in property company 30 and may own a portion (e.g., ten percent) of property company 30.

As explained above, operating utility 40 may lease infrastructure assets 16 from property company 30. The lease terms may be defined according to any suitable lease agreement. Under the lease agreement, utility company may make periodic (e.g., monthly, quarterly, etc.) payments to property company 30. Such payments may be referred to a rental income 24. In some embodiments, the lease agreement may specify that operating utility 40 is responsible for maintenance costs associated with the leased infrastructure assets 16. For example, the lease agreement may be a "triple net" lease under which operating utility 40 is responsible for the costs of or reimbursement for the costs of repairs, insurance, and taxes associated with the leased infrastructure assets 16.

In some embodiments, the lease agreement may permit property company 30 to fund approved capital expenditures 26 associated with the leased infrastructure assets 16. Capital expenditure 26 generally refers to an expenditure to acquire fixed assets and/or to add value to existing fixed assets with a useful life that extends beyond the taxable year. Property company 30 may make capital expenditures 26 to acquire, maintain, update, improve, modernize, and/or expand infrastructure assets 16. Generally, capital expenditures 26 associated with a particular infrastructure asset 16 are amortized or depreciated over the life of the particular asset. Thus, capital expenditures 26 may create and/or add basis to the associated infrastructure assets 16. In some embodiments, investment company 20 and/or property company 30 may raise capital for capital expenditures 26 through a public or private offering of equity interests.

In some embodiments, investment company 20 may own property company 30 indirectly through capital company 50. Capital company 50 refers to any suitable business entity that is able to own at least part of property company 30, and in one example is a holding company. Equity shares of capital company 50 may be publicly or privately traded. Capital company 50 may be owned by investment company 20, sponsor company 60, and/or venture companies 70. Capital company 50 may receive capital (e.g., cash 28, infrastructure assets 16) from sponsor company 60, venture company 70, and/or other suitable entities. Capital company 50 may transfer such capital to property company 30.

As explained above, a portion of capital company 50 may be owned by sponsor company 60 and/or venture companies 70. Sponsor company 60 refers to a business entity that generally manages capital company 50. Sponsor company 60 may provide planning, management, expertise, and/or accounting services that enable capital company 50 and/or property company 30 to strategically acquire, lease, and/or manage infrastructure assets 16. Venture company 70 generally refers to any suitable business entity that contributes capital (e.g., cash 28, infrastructure assets 16, etc.) to capital company 50. In some embodiments, venture company 70 is a utility company that contributes infrastructure assets 16 to capital company 50, which are then contributed to property company 30. In other embodiments, venture company 70 is a financing company that contributes cash 28 to capital company 50. System 10 may comprise any suitable number and combination of venture companies 70.

In some embodiments, by having property company 30 and/or capital company 50 (rather then investment company 20) own infrastructure assets 16, system 10 may provide various benefits to investors 12. For example, investment company 20 may not be permitted to exchange investment company shares 22 for infrastructure assets 16 without triggering a taxable event to the contributor of infrastructure assets 16. In contrast, property company 30 and/or capital company 50 may be able to give their shares in exchange for infrastructure assets 16 without triggering a taxable event for the contributor. In some embodiments, the contributor may then exchange the shares of property company 30 and/or capital company 50 for investment company shares 22 and/or for cash 28 in an amount based on the value 32 (not shown) of investment company shares 22.

The structure of system 10 is scaleable, in many embodiments. In particular, investment company 20 may own a respective portion of multiple capital companies 50. Each capital company 50 may own respective portions of multiple property companies 30. In some embodiments, each property company 30 may lease infrastructure assets 16 to multiple operating utilities 40.

In operation, investment company 20 may, directly or indirectly, receive income that is based on the lease of infrastructure assets 16 from property company 30 to operating utility 40. In particular, property company 30 may own or have a right to use a plurality of infrastructure assets 16. In return for rental income 24, property company 30 leases infrastructure assets 16 to operating utility 40. The lease agreement between property company 30 and operating utility 40 may permit property company 30 to make approved capital expenditures 26 associated with the leased infrastructure assets 16. For example, property company 30 may make capital expenditures 26 to acquire, update, improve, modernize, and/or expand infrastructure assets 16. To pay for capital expenditures 26, property company 30 may use rental payments, may use capital from capital company 50, and/or may raise capital through a public offering of shares of property company 30, capital company 50, and/or investment company 20.

Property company 30 may distribute at least a portion of its income (including rental income 24) to capital company 50. In particular, property company 30 may distribute a predetermined percentage of its adjusted funds from operation (AFFO) to capital company 50. In some embodiments, capital company 50 distributes at least a portion of its income (including rental income 24) to sponsor company 60, venture companies 70, and investment company 20. The amount of the distribution from capital company 50 to investment company 20 may be based at least in part on the percentage of capital company 50 that is owned by investment company 20. Thus, investment company 20 receives income that comprises, at least indirectly, rental income 24 from the lease of infrastructure assets 16 from property company 30 to operating utility 40.

To quality for single-tier taxation, which may be desirable in some but not necessarily all embodiments, investment company 20 may be required to distribute at least a predetermined percentage of its taxable income to its investors 12. In some embodiments, depreciation expenses and/or capital expenditures 26 associated with infrastructure assets 16 may reduce the taxable income of investment company 20. In some embodiments, the taxable income of investment company 20 corresponds to its allocable share of the lower tier companies (i.e., capital company 50 and property company 30). Thus, depreciation expenses and/or capital expenditures 26 of property company 30 may reduce the distributions 14 that investment company 20 may be required to make to investors 12 in order to quality for single-tier taxation. Accordingly, the value 32 (not shown) of investment company shares 22 may increase in response to an increase in capital expenditures 26 associated with infrastructure assets 16. Thus, system 10 may create incentives for investors 12 to, directly or indirectly, invest in infrastructure assets 16.

Figure 2:
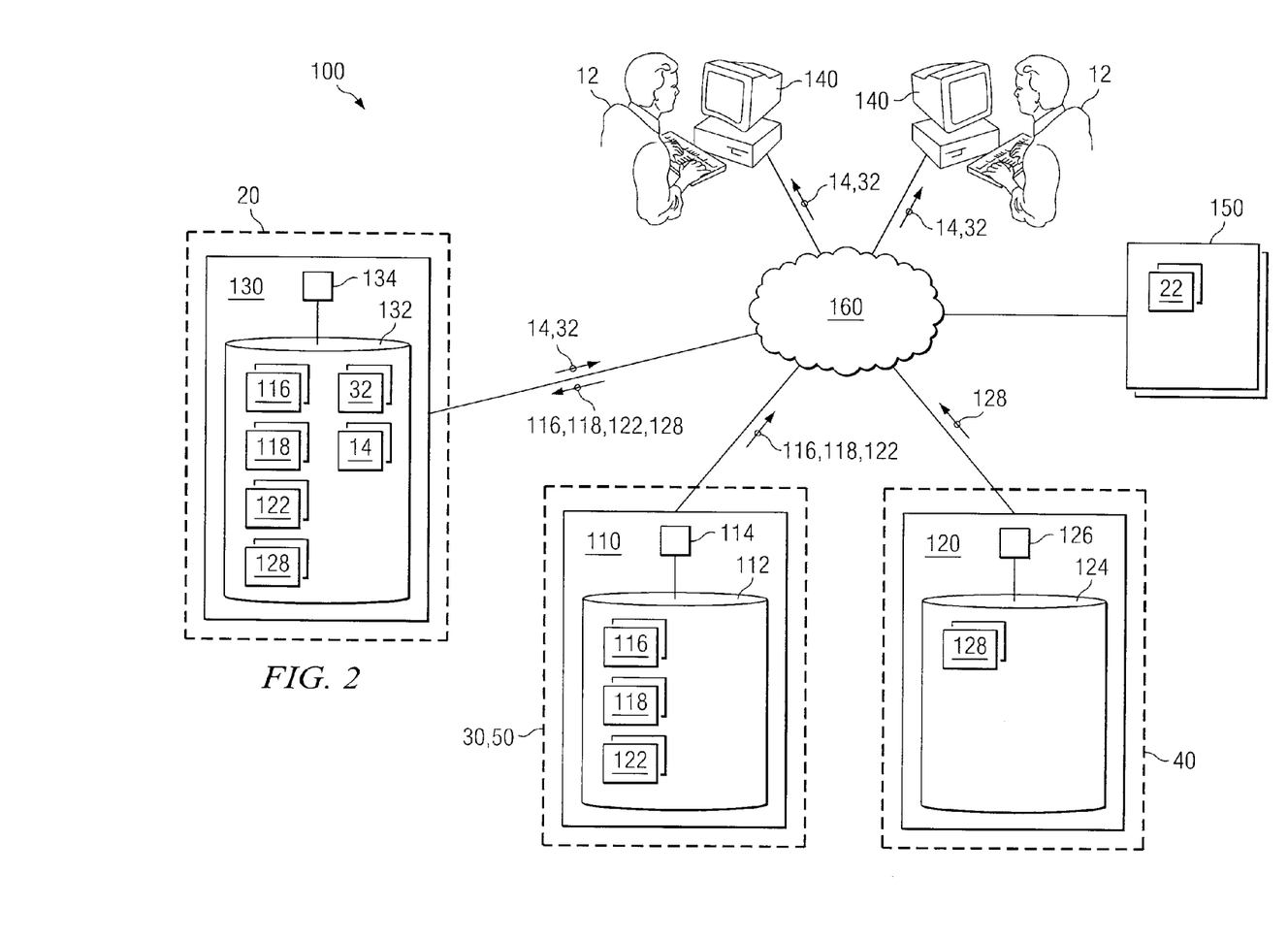
FIG. 2 illustrates a computer system that is operable to determine a current value of investment company shares, according to certain embodiments.

FIG. 2 illustrates a computer system 100 that is operable to determine a current value 32 of investment company shares 22, according to certain embodiments. Computer system 100 may be maintained and/or operated by one or more entities illustrated in FIG. 1. Computer system 100 is generally operable to record and process financial data associated with infrastructure assets 16 and to determine a current value 32 of investment company shares 22. Computer system 100 may comprise a manager server 110, utility server 120, investment server 130, one or more clients 140, and one or more market centers 150 communicatively coupled by one or more networks 160.

Manager server 110 is generally operable to record and process information regarding infrastructure assets 16, capital expenditures 26, rental payments, lease agreements, debt levels, capital contribution data, and/or other suitable information associated with investment system 10. In some embodiments, manager server 110 is maintained and operated by property company 30 and/or capital company 50. Manager server 110 may comprise any suitable combination of hardware and/or software implemented in one or more modules to provide the described functions and operations. In some embodiments, manager server 110 comprises a general-purpose personal computer (PC), a Macintosh, a workstation, a Unix-based computer, a server computer, and/or any suitable processing device. A particular manager server 110 may comprise a manager memory 112 and a manager processor 114.

Manager memory 112 is generally operable to store lease data 116 (including rental income 24), capital expenditure data 118, and/or operations data 122. Lease data 116 may comprise information regarding lease terms, infrastructure assets 16, operating utilities 40, rental payments, and/or other suitable information associated with the lease of infrastructure assets 16 to operating utility 40. Capital expenditure data 118 may comprise information regarding the expansion, acquisition, upgrade, modification, and/or improvement of infrastructure assets 16. Operations data 122 may comprise information regarding debt levels, revenue, distributions 14, financial data, and/or other data associated with property company 30 and/or capital company 50. Manager memory 112 is further operable to store rules, algorithms, code, tables, and/or other suitable instructions for generating and/or managing the lease data 116, capital expenditure data 118, and/or operations data 122. Manager server 110 is operable to transmit lease data 116, capital expenditure data 118, and/or operations data 122 to investment server 130.

Manager memory 112 may be communicatively coupled to manager processor 114 in manager server 110. Manager processor 114 is generally operable to execute rules in manager memory 112 to generate and/or manage lease data 116, capital expenditure data 118, and/or operations data 122. Manager processor 114 may comprise any suitable combination of hardware and software implemented in one or more modules to provide the described function or operation.

In some embodiments, manager server 110 is communicatively coupled to utility server 120. Utility server 120 is generally operable to monitor and/or manage the use of infrastructure assets 16 by operating utility 40. In some embodiments, utility server 120 is maintained and/or operated by operating utility 40. Utility server 120 may comprise any suitable combination of hardware and/or software implemented in one or more modules to provide the described functions and operations. In some embodiments, utility server 120 comprises a general-purpose personal computer (PC), a Macintosh, a workstation, a Unix-based computer, a server computer, and/or any suitable processing device. Utility server 120 may comprise a utility memory 124 and a utility processor 126.

Utility memory 124 is generally operable to store utility data 128. Utility data 128 may comprise information regarding rates, regulations, capital expenditures 26, debt levels, operating and maintenance costs, infrastructure assets 16, rental payments, consumers, revenue, and/or other suitable information regarding operating utility 14. Utility memory 124 is further operable to store rules, algorithms, code, tables, and/or other suitable instructions for determining and managing utility data 128.

Utility memory 124 may be communicatively coupled to utility processor 126 in utility server 120. Utility processor 126 is generally operable to execute rules in utility memory 124 to determine and manage utility data 128. Utility processor 126 may transmit utility data 128 to investment server 130 and/or property server. Utility processor 126 may comprise any suitable combination of hardware and software implemented in one or more modules to provide the described function or operation.

Utility server 120 and/or manager server 110 may be communicatively coupled to investment server 130. Investment server 130 may be maintained and/or operated by investment company 20. Investment server 130 is generally operable to determine taxable income and/or distributions 14 of investment company 20. In some embodiments, investment server 130 is operable to determine the current value 32 of investment company shares 22. The determined value 32 of investment company shares 22 may be based at least in part on lease data 116 and/or capital expenditure data 118 from manager server 110. Investment server 130 may calculate the value 32 of investment company shares 22 such that the calculated value 32 increases in response to an increase in capital expenditures 26 associated with infrastructure assets 16 that are leased from property company 30 to operating utility 40. In some embodiments, an increase in capital expenditures 26 associated with infrastructure assets 16 reduces the taxable income of investment company 20. Because investment company 20 may be required to distribute a predetermined percentage (e.g., ninety percent) of its taxable income to investors 12 in order to quality for single-tier taxation, a reduction in the taxable income of investment company 20 may lower the amount of distributions 14 that investment company 20 is required to make to investors 12. According to certain embodiments, various other factors (e.g., an increase in rental income 24, depreciation expenses, etc.) may reduce taxable income of investment company 20 and/or cause an increase in the value 32 of investment company shares 22.

Investment server 130 may comprise any suitable combination of hardware and/or software implemented in one or more modules to provide the described functions and operations. In some embodiments, investment server 130 comprises a general-purpose personal computer (PC), a Macintosh, a workstation, a Unix-based computer, a server computer, and/or any suitable processing device. Investment server 130 may comprise an investment memory 132 and an investment processor 134.

Investment memory 132 is generally operable to store lease data 116, capital expenditure data 118, and operations data 122 from manager server 110. Investment memory 132 is further operable to store utility data 128 from utility server 120. In some embodiments, investment memory 132 stores rules, algorithms, code, tables, and/or other suitable instructions for determining taxable income, distributions 14, and/or the value 32 of investment company shares 22.

Investment memory 132 may be communicatively coupled to investment processor 134 in investment server 130. Investment processor 134 is generally operable to execute rules in investment memory 132 to perform the described functions and/or operations. Investment processor 134 may transmit the calculated value 32 of investment company shares 22 to clients 140, market centers 150, and/or other components of computer system 100. Investment processor 134 may comprise any suitable combination of hardware and software implemented in one or more modules to provide the described function or operation.

Investment server 130 may be communicatively coupled to one or more clients 140 via network 160. Each client 140 may be associated with a respective investor 12. Client 140 represents any suitable local or remote end-user device that may be used by investors 12 to access one or more elements of computer system 100, such as market centers 150. Investor 12 may use client 140 to submit trading orders, request information, and/or communicate with various components of computer system 100. Using client 140, investor 12 may buy and sell investment company shares 22 and/or other suitable financial instruments. A particular client 140 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of computer system 100. Client 140 may also comprise any suitable user interface such as a display, microphone, keyboard, or any other appropriate terminal equipment according to particular configurations and arrangements. It will be understood that computer system 100 may comprise any number and combination of clients 140.

Clients 140 may be communicatively coupled to market centers 150. Market centers 150 comprise all manner of order execution venues including exchanges, Electronic Communication Networks (ECNs), Alternative Trading Systems (ATSs), market makers, or any other suitable market participants. Each market center 150 maintains a bid price and an offer price for a given trading product by standing ready, willing, and able to buy or sell that trading product at publicly quoted prices. Market centers 150 may maintain order books and may match buy orders and sell orders. Market centers 150 may comprise order books associated with investment company shares 22.

As explained above, various components of computer system 100 may be communicatively coupled by one or more networks 160. Network 160 may represent any number and combination of wireline and/or wireless networks suitable for data transmission. Network 160 may, for example, communicate internet protocol packets, frame relay frames, asynchronous transfer mode cells, and/or other suitable information between network addresses. Network 160 may include one or more intranets, local area networks, metropolitan area networks, wide area networks, cellular networks, all or a portion of the Internet, and/or any other communication system or systems at one or more locations.

It should be understood that the internal structure of computer system 100 and the servers, processors, and memory devices associated therewith is malleable and can be readily changed, modified, rearranged, or reconfigured to achieve the intended operations of computer system 100. For example, the intended operations may be performed by a single computer or by any suitable combination of computers.

It should be further understood that servers in computer system 100 may comprise any suitable type of memory. The respective memory in each server may comprise any suitable arrangement of random access memory (RAM), read only memory (ROM), magnetic computer disk, CD-ROM, DVD, or other magnetic or optical storage media, or any other volatile or non-volatile memory devices that store one or more files, lists, tables, or other arrangements of information. Although FIG. 2 illustrates memory devices that are internal to the respective servers, it should be understood that the memory devices may be internal or external to the respective servers, depending on particular implementations.

In operation, investment server 130 receives lease data 116 and capital expenditure data 118 from manager server 110. Lease data 116 may comprise information regarding rental payments from operating utility 40 to property company 30 for the lease of infrastructure assets 16. Based at least in part on the lease data 116 and/or the capital expenditure data 118, investment server 130 may determine a current value 32 of investment company share 22. According to the teachings of this disclosure, investment server 130 may calculate the value 32 of investment company share 22 such that an increase in capital expenditures 26 results in an increase in the value 32 of investment company share 22. In contrast, capital expenditures 26 in traditional investing systems generally resulted in a decrease in the value of shares associated with various business entities. In system 10, because the value 32 of investment company share 22 may increase in response to capital expenditures 26 in infrastructure assets 16, system 10 may expand opportunities for investing in infrastructure assets 16, according to certain embodiments. Additional details are described below with respect to FIG. 3, which illustrates examples values 32 of investment company shares 22, and with respect to FIG. 4, which illustrates a method for calculating the values 32 of investment company shares 22, according to certain embodiments. According to certain embodiments, investment server 130 may transmit the calculated value 32 of investment company share 22 to clients 140 and/or market centers 150.

Figure 3:
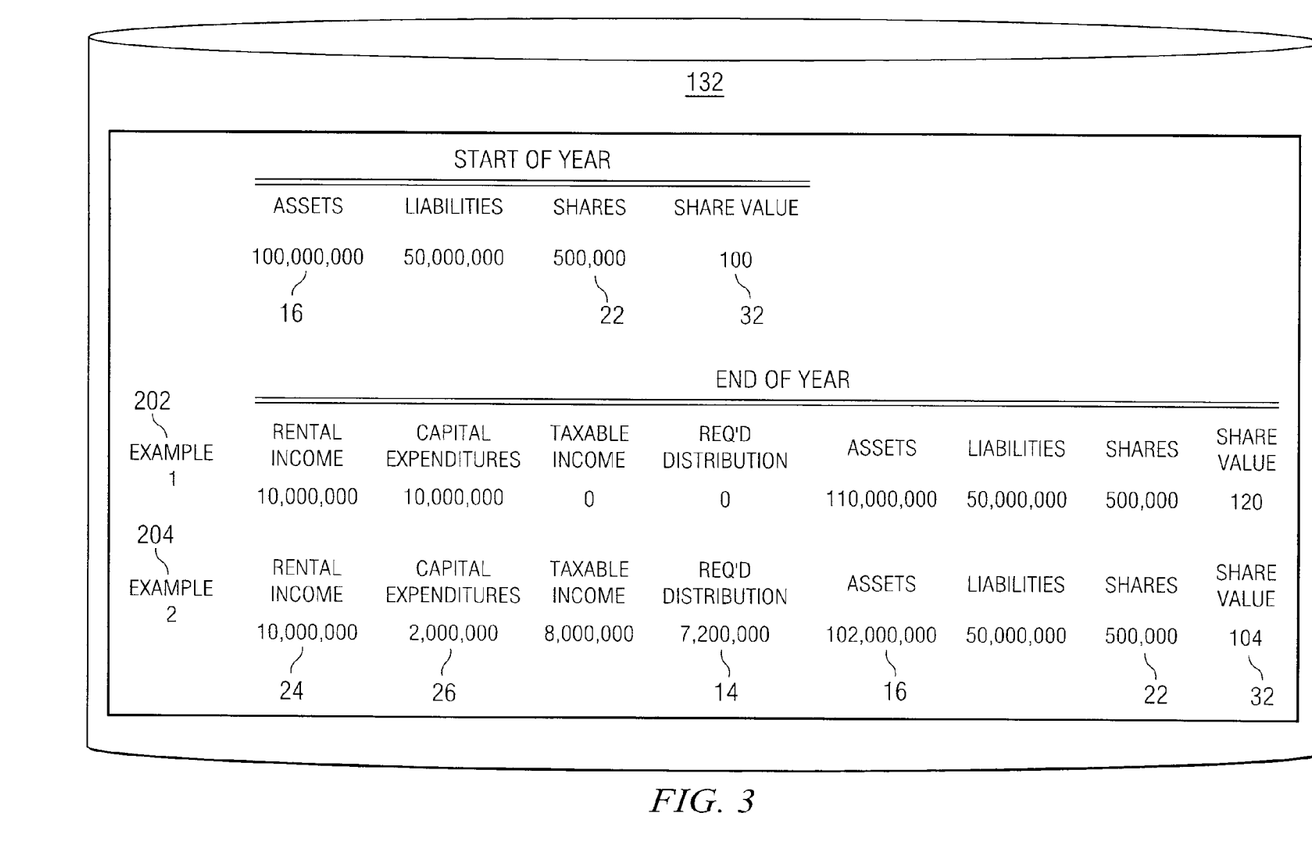
FIG. 3 illustrates example financial data for calculating the value of investment company shares, according to certain embodiments.

FIG. 3 illustrates example financial data for calculating values 32 of investment company shares 22, according to certain embodiments. Investment server 130 may determine the value 32 of investment company shares 22 based at least in part on capital expenditures 26, rental income 24, and depreciation associated with infrastructure assets 16. In this example, simplified financial data is used for teaching purposes to illustrate the effect of capital expenditures 26 on the value 32 of investment company shares 22. It should be understood that actual financial statements and balance sheets may involve additional items (liabilities, assets, deductions, depreciation, etc.) that are omitted from the present example. It should be further understood that, as the financial data is simplified in this example, the accounting formulas are also simplified for teaching purposes. Various embodiments may use accounting formulas that are not simplified, without departing from the scope of this disclosure, In this example, investment company 20 is a REIT that derives income from infrastructure assets 16 that are classified as real estate. Investment company 20 owns property company 30, which leases infrastructure assets 16 to operating utility 40 in return for rental income 24. As a REIT, investment company 20 may qualify for single-tier taxation by satisfying particular distribution requirements. In this example, the distribution requirements require investment company 20 to distribute ninety-percent of its taxable income to investors 12 in order to qualify for single-tier taxation.

In this example, at the start of a given year, investment server 130 calculates the value 32 of investment company share 22 by dividing the equity value of investment company 20 by the total number of investment company shares 22. In some embodiments, the equity value of investment company 20 may be determined by subtracting the liabilities of investment company 20 from the assets of investment company 20. In this example, at the start of the year, property company 30 owns infrastructure assets 16 that have a total value of one hundred million dollars. In addition, investment company 20 comprises five hundred thousand shares and has liabilities of fifty million dollars. Accordingly, at the start of the year, investment server 130 determines that the value 32 of investment company share 22 is one hundred dollars (i.e., (100,000,000−50,000,000)/500,000).

During the year, property company 30 leases infrastructure assets 16 to operating utility 40 in return for rental income 24. In this example, the rental income 24 for the year totals ten million dollars. During the year, property company 30 may make capital expenditures 26 to expand, upgrade, improvement, and/or acquire infrastructure assets 16. The amount of capital expenditures 26 affects the value 32 of investment company share 22. The effect of capital expenditures 26 on the value 32 of investment company share 22 is illustrated by comparing a first investment example (row 202) with a second investment example (row 204).

In the first example 202, property company 30 makes capital expenditures 26 that total ten million dollars. At the end of the year, investment server 130 determines the taxable income of investment company 20. For teaching purposes, taxable income of investment company 20 may be approximated by subtracting the total capital expenditures 26 from the rental income 24 of property company 30. Thus, in the first example, taxable income is zero (i.e., 10,000,000−10,000,000). Although taxable income in this example is approximated by subtracting the total capital expenditures 26 from rental income 24, it should be understood that, in other embodiments, taxable income may be determined, at least in part, by subtracting depreciation from rental income 24. The subtracted depreciation may be based at least in part on capital expenditures 26. For example, the depreciation may be a fraction (e.g., half) of capital expenditures 26.

Investment server 130 may further calculate the distribution 14 that investment company 20 is required to make to qualify for single-tier taxation. The required distributions 14 may be determined by multiplying the required distribution percentage—ninety percent in this example—by the taxable income of investment company 20. In the first example 202, investment server 130 calculates that the required distribution 14 is zero (i.e., 0×90%).

Investment server 130 then calculates an updated value 32 of investment company share 22. In the first example 202, the value of infrastructure assets 16 has grown due to capital expenditures 26. In particular, the value of infrastructure assets 16 at the end of the year is one hundred and ten million dollars (i.e., 100,000,000+10,000,000 in capital expenditures 26). Investment server 130 may then determine the value 32 of investment company share 22. For teaching purposes, the value 32 of investment company share 22 may be approximated by dividing the current value of infrastructure assets 16 by the number of investment company shares 22. Accordingly, the updated value 32 of investment company share 22 at the end of the year is one hundred and twenty dollars (i.e., (110,000,000−50,000,000)/500,000). Thus, in the first example 202, the value 32 of investment company share 22 increased by twenty percent during the year.

In the second example 204, the amount of capital expenditures 26 is less than in the first example 202. In particular, property company 30 makes capital expenditures 26 that total two million dollars. At the end of the year, investment server 130 determines that the taxable income of investment company 20 is eight million dollars (i.e., 10,000,000−2,000,000). Investment server 130 also determines that the required distribution 14 is seven million two hundred thousand dollars (i.e., 8,000,000×90%). Thus, in the second example 204, investment server 130 distributes seven million two hundred thousand dollars to investors 12 of investment company 20.

At the end of the year, investment server 130 calculates an updated value 32 of investment company share 22. In the second example 204, the value of infrastructure assets 16 has grown to one hundred and two million dollars (i.e., 100,000,000+2,000,000 in capital expenditures 26). Accordingly, in the second example 204, investment server 130 determines that the updated value of investment company share 22 is one hundred and four dollars (i.e., (102,000,000−50,000,000)/500,000). Thus, while the value 32 of investment company share 22 in the first example 202 increased by twenty percent, the value 32 of investment company share 22 in the second example 204 increased by four percent. Thus, the value 32 of investment company share 22 may increase in response to an increase in capital expenditures 26.

In the foregoing example, investment company 20 owns property company 30. However, it should be understood that, in some embodiments, investment company 20 may own (at least in part) a capital company 50 that owns (at least in part) property company 30.

In the foregoing example, the value 32 of investment company 20 is based on infrastructure assets 16 of a single property company 30. It should be understood, however, that the value 32 of investment company 20 may be based on infrastructure assets 16 of multiple property companies 30, according to certain embodiments.

In the foregoing example, the number of investment company shares 22 of investment company 20 did not change over the course of the year. It should be understood, however, the number of investment company shares 22 may change due to a public offering, a "buy back" of investment company shares 22, and/or other suitable events.

In the foregoing example, investment server 130 determined an updated value 32 of investment company share 22 at the end of a year. It should be understood, however, that investment server 130 may be configured to update the value 32 of investment company share 22 after any suitable time period (e.g., hourly, daily, weekly, etc.).

In the foregoing example, investment company 20 is a REIT. It should be understood, however, that investment company 20 may be a MLP or other suitable business entity.

Figure 4:
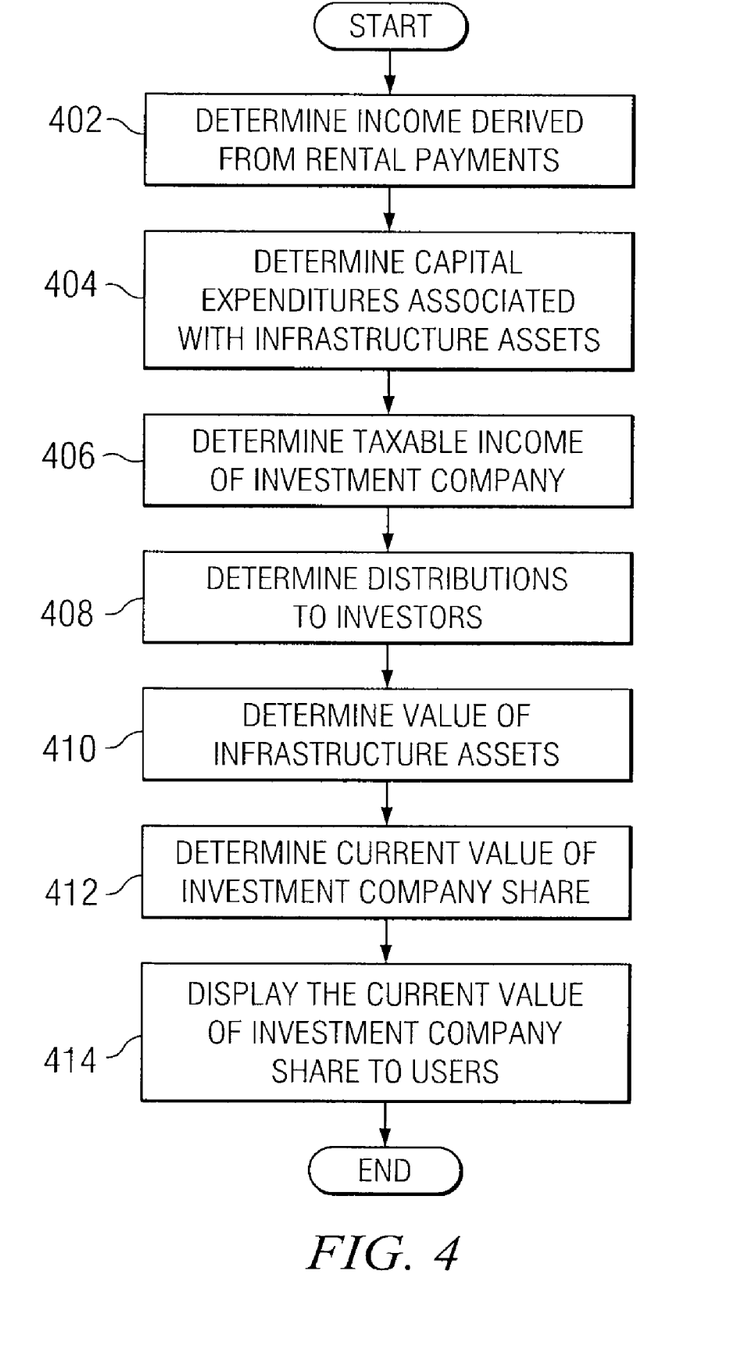
FIG. 4 illustrates a flowchart for determining the value of investment company shares, according to certain embodiments.

FIG. 4 illustrates a flowchart for determining the value 32 of investment company share 22, according to certain embodiments. In one embodiment, this calculation is performed by investment server 130 as described in the following discussion; however, it should be understood that any processing device or combination of processing devices in computer system 100 may perform this calculation. The method begins at step 402 where investment server 130 determines the income of investment company 20 that is derived from the lease of infrastructure assets 16 from property company 30 to operating utility 40. In some embodiments, investment company 20 has a direct ownership interest in property company 30. In other embodiments, investment company 20 owns (at least in part) a capital company 50 that owns (at least in part) property company 30. According to certain embodiments, infrastructure assets 16 may be considered real estate assets. Under the lease agreement between operating utility 40 and property company 30, operating utility 40 may be responsible for taxes and repair, insurance, and interest costs associated with the leased infrastructure assets 16. In some embodiments, the lease agreement may permit property company 30 to make capital expenditures 26 to upgrade, improve, modernize, and/or expand infrastructure assets 16.

At step 404, investment server 130 determines the amount of capital expenditures 26 associated with infrastructure assets 16. In some embodiments, capital expenditures 26 associated with infrastructure assets 16 may be made by property company 30, capital company 50, and/or investment company 20. At step 406, investment server 130 determines taxable income of investment company 20. Taxable income may be based at least in part on (1) the value of rental payments from operating utility 40 to property company 30 and/or (2) the determined amount of capital expenditures 26. In some embodiments, taxable income of investment company 20 is proportional to its allocable share of the lower tier entities (e.g., property company 30 and capital company 50).

At step 408, investment server 130 determines the distributions 14 of investment company 20 to its investors 12. In some embodiments, to qualify for single-tier taxation, investment company 20 may be required to distribute a predetermined percentage (e.g., ninety percent) of its taxable income to investors 12. Investment server 130 may determine the amount of distributions 14 by multiplying the predetermined percentage by the taxable income of investment company 20.

At step 410, investment server 130 determines the value of infrastructure assets 16 associated with property company 30. The value of infrastructure assets 16 may be based at least in part on the determined capital expenditures 26 and on the infrastructure assets 16 that are leased from property company 30 to operating utility 40. At step 412, investment server 130 determines the current value 32 of investment company share 22. This determination may be based at least in part on the determined value of infrastructure assets 16 and/or the number of outstanding investment company shares 22. At step 414, investment server 130 may cause one or more clients 140 to display the determined value 32 of investment company share 22 to one or more users such as, for example, investors 12, sponsors, and/or other parties. The method then ends.

Although the present invention has been described in detail, it should be understood the various changes, substitutions, and alterations can be made hereto without departing from the scope of the invention as defined by the appended claims.

What is claimed is:

1. A system, comprising:
a memory operable to store financial data associated with a real estate investment trust (REIT) having a plurality of REIT shares, the REIT receiving, directly or indirectly, income associated with rent or lease of infrastructure assets that are associated with a regulated rate of return, the rent or lease paid by an operating utility to a property company; and
a processor communicatively coupled to the memory and operable to:
determine revenue of the REIT based at least in part on the income and capital expenditures that are associated with the infrastructure assets and that are paid by the property company;
determine a value of each REIT share such that an increase of the capital expenditures results in an increase of the value of each REIT share; and
transmit the determined value to a user.

2. A system, comprising:
a memory operable to store financial data associated with a real estate investment trust (REIT) having a plurality of REIT shares, the REIT receiving, directly or indirectly, income associated with rent or lease of real estate paid by a first company to a second company; and
a processor communicatively coupled to the memory and operable to determine a value of each REIT share, the processor operable to calculate an increase in the value of each REIT share in response to an increase of capital expenditures associated with the real estate.

3. The system of claim 2, wherein the processor is operable to transmit the determined value to a user.

4. The system of claim 2, wherein the real estate is associated with a regulated rate of return and the increase of capital expenditures associated with the real estate is a guaranteed increase.

5. The system of claim 2, wherein the real estate comprises electric transmission and distribution assets (ETDAs), water delivery assets, gas pipelines, or energy storage facilities.

6. The system of claim 2, wherein the capital expenditures associated with the real estate represent a currency amount that is spent on acquiring, expanding, maintaining, improving, or repairing one or more fixed assets associated with the real estate.

7. The system of claim 2, wherein the first company is an operating utility, the second company is a property company, and the capital expenditures are expenditures paid by the property company.

8. The system of claim 7, wherein:
the REIT owns, at least indirectly, at least a portion of the property company; and
the operating utility owns at least a portion of the property company.

9. The system of claim 2, wherein:
the first company is an operating utility and the second company is a property company;
the received income is associated with rent or lease of real estate paid by a plurality of operating utilities to one or more property companies.

10. The system of claim 2, wherein:
the first company is an operating utility and the second company is a property company that is owned at least in part by a third company that is owned at least in part by the REIT; and
the income is based at least in part on rental payments from the operating utility to the property company such that at least a portion of the rental payments pass from the property company to the third company and from the third company to the REIT.

11. The system of claim 2, wherein the processor is further operable to determine an income of the REIT based at least in part on the income and the capital expenditures.

12. The system of claim 11, wherein the processor is further operable to calculate distribution of the REIT to shareholders of the REIT based at least in part on a predetermined percentage of the income.

13. The system of claim 2, wherein the plurality of REIT shares are available for public trading on one or more electronic exchanges.

14. The system of claim 2, wherein the plurality of REIT shares are available for purchase through a private placement.

15. A system, comprising:
a memory operable to store financial data associated with a master limited partnership (MLP) having a plurality of MLP shares, the MLP receiving, directly or indirectly, income associated with rent or lease of infrastructure assets paid by a first company to a second company; and
a processor communicatively coupled to the memory and operable to determine a value of each MLP share, the processor operable to calculate an increase in the value of each MLP share in response to an increase of capital expenditures associated with the infrastructure assets.

16. The system of claim 15, wherein the processor is operable to transmit the determined value to a user.

17. The system of claim 15, wherein the infrastructure assets are associated with a regulated rate of return and the increase of capital expenditures associated with the infrastructure assets is a guaranteed increase.

18. The system of claim 15, wherein the infrastructure assets comprise electric transmission and distribution assets (ETDAs), water delivery assets, gas pipelines, or energy storage facilities.

19. The system of claim 15, wherein the capital expenditures associated with the infrastructure assets represent a currency amount that is spent on acquiring, expanding, maintaining, improving, or repairing one or more infrastructure assets.

20. The system of claim 15, wherein the first company is an operating utility, the second company is a property company, and the capital expenditures are expenditures paid by the property company.

21. The system of claim 20, wherein:
the MLP owns, at least indirectly, at least a portion of the property company; and
the operating utility owns at least a portion of the property company.

22. The system of claim 15, wherein:
the first company is an operating utility and the second company is a property company;
the received income is associated with rent or lease of infrastructure assets paid by a plurality of operating utilities to one or more property companies.

23. The system of claim 15, wherein:
the first company is an operating utility and the second company is a property company that is owned at least in part by a third company that is owned at least in part by the MLP; and
the income is based at least in part on rental payments from the operating utility to the property company such that at least a portion of the rental payments pass from the property company to the third company and from the third company to the MLP.

24. The system of claim 15, wherein the processor is further operable to determine an income of the MLP based at least in part on the income and the capital expenditures.

25. The system of claim 24, wherein the processor is further operable to calculate distribution of the MLP to shareholders of the MLP based at least in part on a predetermined percentage of the income.

26. The system of claim 15, wherein the plurality of MLP shares are available for public trading on one or more electronic exchanges.

27. The system of claim 15, wherein the plurality of MLP shares are available for purchase through a private placement.

28. A system, comprising:
a first server operable to generate financial data associated with a business entity having a plurality of shares, the business entity comprising a real estate investment trust (REIT) or a master limited partnership (MLP), the business entity receiving, directly or indirectly, income associated with rent or lease of infrastructure assets, the rent or lease paid by a first company to a second company; and
a second server operable to receive, via a network, the financial data from the first server, the second server further operable to determine a value of each share and to calculate an increase in the value of each share in response to an increase of capital expenditures associated with the infrastructure assets.

29. A system, comprising:
a memory operable to store financial data associated with a business entity having a plurality of shares, the business entity comprising a real estate investment trust (REIT) or a master limited partnership (MLP), the business entity receiving, directly or indirectly, income associated with rent or lease of a system of assets, the system of assets including assets that are not land and that are not structures or fixtures attached to land, the rent or lease paid by a first company to a second company; and
a processor communicatively coupled to the memory and operable to determine a value of each share, the processor operable to calculate an increase in the value of each share in response to an increase of capital expenditures associated with the system of assets.

30. The system of claim 29, wherein the system of assets includes at least one transmission cable, transformer substation, electricity meter, pipeline, insulator, circuit breaker, relay panel, or shield wire.

* * * * *